US010822706B2

(12) United States Patent
Kim et al.

(10) Patent No.: US 10,822,706 B2
(45) Date of Patent: Nov. 3, 2020

(54) SYSTEM AND METHOD FOR REINFORCING AND PROTECTING REINFORCED CONCRETE STRUCTURE EMPLOYING CARBON FIBER TEXTILE GRID AS BOTH REINFORCEMENT MEMBER AND ANODE

(71) Applicant: KOREA INSTITUTE OF CIVIL ENGINEERING AND BUILDING TECHNOLOGY, Gyeonggi-do (KR)

(72) Inventors: Hyeong Yeol Kim, Gyeonggi-do (KR); Seung Seop Jin, Incheon (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 136 days.

(21) Appl. No.: 16/174,292

(22) Filed: Oct. 30, 2018

(65) Prior Publication Data

US 2020/0024753 A1 Jan. 23, 2020

(30) Foreign Application Priority Data

Jul. 19, 2018 (KR) .................. 10-2018-0084050

(51) Int. Cl.
  *C23F 13/16* (2006.01)
  *C23F 13/04* (2006.01)
  *C23F 13/22* (2006.01)

(52) U.S. Cl.
  CPC ............. *C23F 13/16* (2013.01); *C23F 13/04* (2013.01); *C23F 13/22* (2013.01); *C23F 2201/02* (2013.01); *C23F 2213/10* (2013.01)

(58) Field of Classification Search
  None
  See application file for complete search history.

(56) References Cited

U.S. PATENT DOCUMENTS 5,183,694 A   2/1993  Webb

FOREIGN PATENT DOCUMENTS

JP    2004027709 A  *  1/2004
JP    2010222653       10/2010
(Continued)

OTHER PUBLICATIONS

Machine translation of JP-2004027709-A. (Year: 2004).*

*Primary Examiner* — Brian W Cohen
(74) *Attorney, Agent, or Firm* — JCIPRNET

(57) ABSTRACT

Provided are a system and method for reinforcing and protecting a reinforced concrete structure in which a reinforced concrete structure is divided and corrosion factors of the divided cross-sectional regions are monitored to automatically supply a protection current to each of the divided cross-sectional regions, thereby actively performing protection of the reinforced concrete structure, and also, by adjusting the level of a protection current according to the progression of corrosion in each divided cross-sectional region of the reinforced concrete structure, power consumption required for protection is optimized and protection is effectively performed, and also by disposing a carbon fiber textile grid in the surface of the reinforced concrete structure to be employed as both a reinforcement member and an anode of the reinforced concrete structure, microcracking which may occur in concrete curing is inhibited and thus permeation of moisture or a chloride into the surface thereof is prevented.

5 Claims, 7 Drawing Sheets

(56) References Cited

FOREIGN PATENT DOCUMENTS

| | | |
|---|---:|---:|
| JP | 2017128769 | 7/2017 |
| KR | 20050034276 | 4/2005 |
| KR | 20050101676 | 10/2005 |
| KR | 10-539380 | 12/2005 |
| KR | 10-552347 | 2/2006 |
| KR | 20130046874 | 5/2013 |
| KR | 10-1347707 | 1/2014 |
| KR | 10-1468328 | 12/2014 |
| KR | 10-1792426 | 11/2017 |

* cited by examiner

SYSTEM AND METHOD FOR REINFORCING AND PROTECTING REINFORCED CONCRETE STRUCTURE EMPLOYING CARBON FIBER TEXTILE GRID AS BOTH REINFORCEMENT MEMBER AND ANODE

CROSS-REFERENCE TO RELATED APPLICATION

This application claims priority to and the benefit of Korean Patent Application No. 2018-0084050, filed on Jul. 19, 2018, the disclosure of which is incorporated herein by reference in its entirety.

BACKGROUND

1. Field of the Invention

The present disclosure relates to reinforcement and anti-corrosion of a reinforced concrete structure, and more particularly, to a system for reinforcing and protecting a reinforced concrete structure using a carbon fiber textile grid which is formed of a conductive material and serves as both a reinforcement member and an anode for reinforcement and anti-corrosion of the reinforced concrete structure, and a method thereof.

2. Discussion of Related Art

The most widely used reinforced concrete for construction and civil engineering is an economical and highly durable structural material. Until now, it has been generally recognized that reinforced concrete has a service life of about half a century without special maintenance.

In fact, reinforced concrete, a combination of concrete and rebar is known as a composite material that has optimal functions in terms of mechanical strength as well as long-term durability. However, several recent studies and field surveys have shown that reinforced concrete has degraded durability due to corrosion of the rebar and thus causes serious problems throughout the structure.

The main reason that degrades the durability of such reinforced concrete structure is the corrosion of the embedded rebar, and the main reason that causes the corrosion of the embedded rebar may be permeation of chlorine ions and carbon dioxide. Once the buried rebar is corroded, a corrosion product is formed on the surface of the embedded rebar, causing cracking and peeling, and such cracking and peeling facilitates the permeation of external harmful factors, thereby accelerating the corrosion of the rebar.

Therefore, the safety and durability of the reinforced concrete structure are severely degraded, and in severe cases, the structure may collapse. In addition, when the reinforced concrete structure is previously damaged, repair and reinforcement of the structure are very difficult and limited, and economically very expensive.

Specifically, deterioration of such a reinforced concrete structure is affected by the quality of the used concrete and rebar, environmental and physical factors, and is greatly affected by the corrosion of the rebar embedded in the concrete. Particularly, in the case of the reinforced concrete structure located in a marine environment, when the salt contained in the sea water permeates into the concrete, or calcium chloride used to melt snow on the winter road permeates into the concrete, rebar embedded in the concrete tends to be corroded, and the corroded rebar expands, resulting in minute cracks in the concrete.

The microcracks formed as described above extend to the concrete surface, and external air or moisture further permeates into the concrete between the cracks extending to its surface, thereby further promoting the detachment and peeling of the concrete, and the corrosion of the internal rebar. In addition, a salt content penetrating into the concrete may react with hydrated lime in the concrete having a high alkaline content with an initial pH 12 to 13 to produce carbonated lime, thereby neutralizing the concrete.

Recently, various methods have been developed to prevent the corrosion of rebar embedded in the concrete in a reinforced concrete structure, and to repair the detached cross-section of the concrete. One of the methods is repairing the detached concrete cross-section with repair mortar. However, when the repair is carried out by the above-mentioned method, since salt content contained in the concrete is not completely removed, the rebar is corroded, and thus a repaired site is easily detached.

As another method, to prevent the corrosion of a reinforced concrete structure according to the conventional art, in order to inhibit the permeation of moisture and a chloride, the chloride permeation resistance performance of concrete is enhanced or epoxy-coated rebar is applied, however, it is difficult to expect a perfect anti-corrosion effect.

As still another method, cathodic protection for inhibiting the progression of the corrosion of steel by reducing a potential of the steel to a potential at which the steel is not corroded by applying a current to the steel of rebar in the concrete from an electrode (anode) installed near the surface of the concrete, has been known. It has been known that, for the cathodic protection, a sacrificial anode method and an impressed current method may be applied. In the case of the sacrificial anode method, there were disadvantages in which many anodes are needed, and when an oxide film is formed near the anode or the anode is consumed, an anti-corrosion effect is not exhibited, and in the case of the impressed current method, there was a disadvantage in which an expensive anode should be installed.

Particularly, the impressed current method is cathodic protection which is accomplished by forming an electrode of a direct current power supply at a protection anode, forming an electrical circuit by connecting a cathode with steel as a target for anti-corrosion, and applying a protection current from the protection anode to the steel using such an electrical circuit. In the impressed current method, a protection anode having high corrosion resistance such as a titanium mesh, a titanium grid or a titanium rod is installed directly on a concrete surface or by forming a groove or hole, and then fixing with mortar. For this reason, this method has problems in that production costs are high due to the use of an anode with high corrosion resistance, and installation is complicated.

Meanwhile, conventionally, a lattice-type geogrid (or "grid") is a reinforcement member used for reinforcement of a retaining wall, a slope and the ground in public works. Such a grid is required to have high tensile strength and low tensile strain (low elongation) in addition to properties such as installation damage resistance, a friction property, etc.

To manufacture such a grid, generally, a method of injecting or extruding plastic, perforating a hole at regular intervals, and then performing uniaxial or biaxial elongation is used. However, a lattice-type grid using an injected plastic has low tensile strength, is difficult to manufacture in a continuous process, and has a limitation in its size or shape.

Accordingly, in recent years, a textile grid reinforcement member manufactured by preparing a textile grid fabric by weaving or knitting lattice-type woven fabrics using high-strength fiber, coating a surface of the textile grid reinforcement member with a resin coating liquid such as polyvinyl chloride, bitumen, an acrylic, latex and a rubber-based resin, and then performing high-temperature thermal treatment is effectively used for construction and reinforcement of a concrete structure.

In addition, since a textile grid uses higher-strength fiber than a plastic grid, it exhibits high tensile strength and low tensile strain, which are excellent structural material properties for construction and reinforcement of a structure.

FIG. 1 is a diagram showing a planar grid formed with a common textile grid, and FIG. 2 is a diagram showing a concrete panel reinforced with a common textile grid.

As shown in FIGS. 1 and 2, a planar grid formed with a textile grid 10 produced by weaving high-strength fiber such as glass fiber, carbon fiber or basalt fiber to have a lattice form of a weft 10a and warp 10b has been widely used as a light-weight and thin film-type reinforcement member in construction and civil engineering fields. FIG. 2 shows textile-reinforced concrete formed by placing mortar or concrete 20 on a textile grid 10.

Meanwhile, as prior art, in Korean Unexamined Patent Application Publication No. 2005-34276, cathodic protection is controlled throughout a target range through an impressed current method by a real-time sensing system and monitoring using a wired/wireless communication system by embedding a number of corrosion sensors for detecting corrosion in a reinforced concrete structure. Therefore, there is a disadvantage in which cathodic protection efficiency is degraded when cathodic protection is performed differently for each main position of the structure according to an exposure environment.

As another prior art, in Korean Patent No. 10-552347, a method of real-time monitoring of corrosion by embedding numerous corrosion sensors for detecting corrosion and numerous sacrificial anodes in a reinforced concrete structure is disclosed, but there is a disadvantage of consumption of the anodes during a performance period by applying cathodic protection regardless of the occurrence of corrosion.

As still another prior art, in Korean Unexamined Patent Application Publication No. 2013-46874, a method of applying an impressed current method and a sacrificial anode method by dividing the cross-section of a marine structure into a submerged zone and a splash zone has been disclosed, but there is no method of measuring corrosion. Accordingly, since a system is configured to generate the predetermined protection current, it is impossible to control active cathodic protection according to a progression degree of corrosion.

As yet another prior art, in Korean Patent No. 10-1792426, a system and device for monitoring a deterioration factor that corrodes reinforced concrete are disclosed, but there is no active protection method when corrosion occurs.

As described above, reinforcing and cathodic protection methods according to the conventional art had problems as follows. First, because of the absence of a reinforcement member which can actively inhibit microcracking on a surface in construction of a reinforced concrete structure, there may have problems in durability and safety of the structure, resulting from microcracking, rebar corrosion, detachment, and loss of a cross-section caused by the rebar corrosion.

In addition, while cathodic protection through an impressed current method is performed on a structure requiring protection, such as a marine or harbor structure, since a protection current is supplied without measurement of a corrosion current generated by the corrosion of rebar, a suitable protection current density may not be provided, thereby degrading a protection effect.

In addition, since the corrosion of a structure requiring protection, such as a marine or harbor structure, may depend on a corrosive environment to which the structure is exposed, it is efficient to control a protection current density to suit a degree of corrosion. However, since an anode used in the impressed current method is formed of a titanium mesh or titanium ribbon, economic feasibility and installability are deteriorated.

PRIOR ART LITERATURE (Patent Literature 0001) Korean Patent No. 10-539380 (Filing Date: Oct. 9, 2003), Invention Title: System for monitoring permeation of deterioration factor into reinforced concrete structure (Patent Literature 0002) Korean Patent No. 10-552347 (Filing Date: Aug. 23, 2005), Invention Title: Deteriorated reinforced concrete structure and protection repair/reinforcement system thereof.

(Patent Literature 0003) Korean Patent No. 10-1347707 (Filing Date: Oct. 28, 2011), Invention Title: Hybrid cathode protection system for offshore concrete structure using impressed current cathodic protection and sacrificial anode cathodic protection techniques (Patent Literature 0004) Korean Patent No. 10-1792426 (Filing Date: Jun. 28, 2016), Invention Title: System and apparatus for monitoring degradation factor generating corrosion of steel embedded in concrete, and method for monitoring the same (Patent Literature 0005) Korean Patent No. 10-1468328 (Filing Date: Oct. 8, 2013), Invention Title: Corrosion monitoring device of reinforced concrete construction (Patent Literature 0006) Korean Unexamined Patent Application Publication No. 2005-101676 (Publication Date: Oct. 25, 2005), Invention Title: Sensor and system for monitoring corrosion of steel embedded in concrete structure (Patent Literature 0007) Japanese Laid-Open Patent Publication No. 2010-222653 (Publication Date: Oct. 7, 2010), Invention Title: Reinforced protection sheet and reinforced protection installation method of concrete structure (Patent Literature 0008) Japanese Laid-Open Patent Publication No. 2017-128769 (Publication Date: Jul. 27, 2017), Invention Title: Dielectric anode unit and cathodic protection structure of concrete structure using the same

SUMMARY OF THE DISCLOSURE

To solve the above-described problems, an objective of the present disclosure is directed to providing a system and method for reinforcing and protecting a reinforced concrete structure employing a carbon fiber textile grid as both a reinforcement member and an anode, which can actively perform protection of a reinforced concrete structure by dividing a reinforced concrete structure and monitoring corrosion factors of divided cross-sectional regions to automatically supply a protection current to each divided cross-sectional region.

Another objective of the present disclosure is directed to providing a system and method for reinforcing and protecting a reinforced concrete structure employing a carbon fiber textile grid as both a reinforcement member and an anode, which can optimize power consumption required for protection and effectively perform protection by adjusting a required level of protection current depending on the progression of corrosion for each divided cross-sectional region of the reinforced concrete structure.

Still another objective of the present disclosure is directed to providing a system and method for reinforcing and protecting a reinforced concrete structure employing a carbon fiber textile grid as both a reinforcement member and an anode, which can prevent permeation of moisture or a chloride into a surface by inhibiting microcracking which may occur in concrete curing by disposing the carbon fiber textile grid close to the surface of the reinforced concrete structure so that the carbon fiber textile grid can be employed as the reinforcement member and the anode.

To attain the above-described technical objectives, in one aspect, the present disclosure provides a system for reinforcing and protecting a reinforced concrete structure employing a carbon fiber textile grid as both a reinforcement member and an anode, the system including: a reinforced concrete structure in which rebar is embedded, and which is divided into cross-sectional regions with a predetermined size; a carbon fiber textile grid which is formed in a lattice shape and disposed adjacent to the surface of the reinforced concrete structure to reinforce the reinforced concrete structure, and is formed of a conductive material to be used as an anode (+) for protection of the embedded rebar; conductive wires for supplying a protection current, which are respectively connected to the carbon fiber textile grid and the embedded rebar to supply a protection current to the embedded rebar by external power; a corrosion factor-measuring sensor which is embedded in the reinforced concrete structure so as to measure corrosion factors of the embedded rebar; and a protection controller which consists of a corrosion-monitoring part, a protection current-setting part and a protection current-supplying part, automatically monitors the corrosion factor measured by the corrosion factor-measuring sensor, and when the measured corrosion factor is the threshold value or more, automatically supplies external power to the carbon fiber textile grid, which is an anode, and embedded rebar, which is a cathode, thereby generating a protection current, wherein the protection controller monitors each of corrosion factors in a divided cross-sectional region of the reinforced concrete structure and automatically supplies the protection current to each divided cross-sectional region, thereby actively performing protection of the reinforced concrete structure.

Here, the carbon fiber textile grid is a reinforcement member which inhibits microcracking occurring in concrete curing, prevents permeation of moisture or a chloride, and serves as an anode (+), and the embedded rebar serves as a cathode (−).

Here, the carbon fiber textile grid is preferably coated with a material with excellent conductivity, such as styrene butadiene rubber (SBR) or nickel, to uniformly apply an electric current.

Here, the cross-sectional regions of the reinforced concrete structure are divided into at least two or more regions in a horizontal or vertical direction according to a corrosive environment and insulated, and thus are independently protected.

Here, the protection controller may include a corrosion-monitoring part which regularly monitors the corrosion factors measured by the corrosion factor-measuring sensor; a protection current-setting part which sets a suitable protection current by comparing the corresponding threshold value with the corrosion factor measured by the corrosion factor-measuring sensor; and a protection current-supplying part which supplies the protection current set by the protection current-setting part to the embedded rebar through the conductive wires for supplying a protection current.

Here, the corrosion-monitoring part may employ an electrochemical method (potentiometric method or linear polarization resistance) or a physical method (optical sensor) selectively as necessary, or a complementary combination thereof in order to monitor the corrosion of the embedded rebar.

Also, in another aspect, the present disclosure provides a method for reinforcing and protecting a reinforced concrete structure employing a carbon fiber textile grid as both a reinforcement member and an anode, the method including: a) dividing a reinforced concrete structure to be reinforced and protected into suitable sizes; b) disposing a carbon fiber textile grid in each of the divided cross-sections of the reinforced concrete structure to be adjacent to rebar embedded in the reinforced concrete structure; c) connecting conductive wires for supplying a protection current to the carbon fiber textile grid and the embedded rebar, respectively; d) installing a corrosion factor-measuring sensor which measures a corrosion factor in each of the divided cross-sections of the reinforced concrete structure; e) installing a protection controller consisting of a corrosion-monitoring part, a protection current-setting part and a protection current-supplying part; f) regularly monitoring the measured corrosion factor by the corrosion-monitoring part of the protection controller; and g) setting a suitable protection current, by the protection current-setting part of the protection controller, by comparing the correction factor measured by the corrosion factor-measuring sensor with the corresponding threshold value, and supplying a protection current, by the protection current-supplying part of the protection controller, through the conductive wires for supplying a protection current, wherein the protection controller monitors each corrosion factor in the divided cross-sectional region of the reinforced concrete structure and automatically supplies a protection current to each divided cross-sectional region, thereby actively performing protection of the reinforced concrete structure.

BRIEF DESCRIPTION OF THE DRAWINGS

The above and other objectives, features and advantages of the present disclosure will become more apparent to those of ordinary skill in the art by describing in detail exemplary embodiments thereof with reference to the accompanying drawings.

DETAILED DESCRIPTION OF EXEMPLARY EMBODIMENTS

Figure 1:
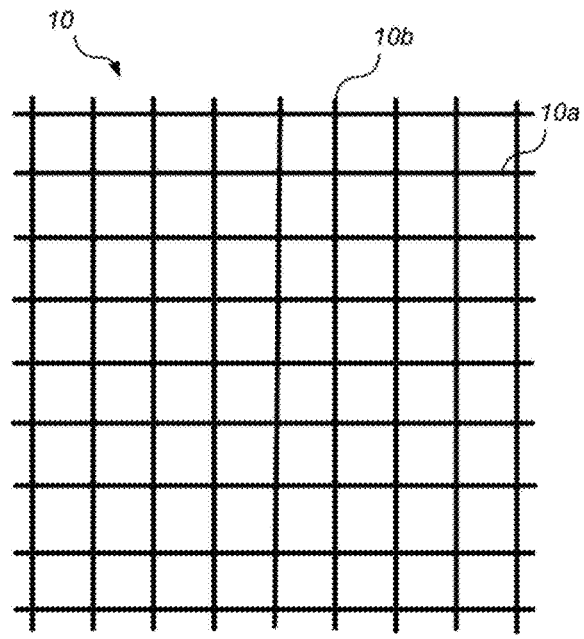
FIG. 1 is a diagram showing a planar grid as a common textile grid.
Figure 2:
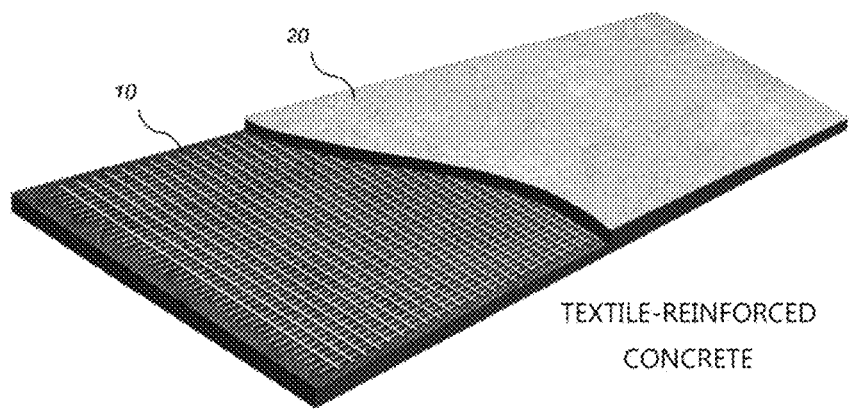
FIG. 2 is a diagram showing a concrete panel reinforced by a common textile grid.

Hereinafter, embodiments of the present disclosure will be described in detail with reference to the accompanying drawings so that those of ordinary skill in the art can easily carry out the present disclosure. However, the present disclosure may be implemented in a variety of different forms, and is not limited to the embodiments described herein. In addition, for clear explanation of the present disclosure in the drawings, parts that are not related to the description are omitted, and like numerals denote like parts throughout the specification.

Throughout the specification, when one part "includes" a component, it means that it may also include other components, not excluding components unless particularly stated otherwise. In addition, the term "~ part" used herein refers to a unit of processing at least one function or operation, and may be implemented as hardware, software, or a combination of hardware and software.

[System for Reinforcing and Protecting Reinforced Concrete Structure Employing Carbon Fiber Textile Grid as Reinforcement Member and Anode]

Figure 3:
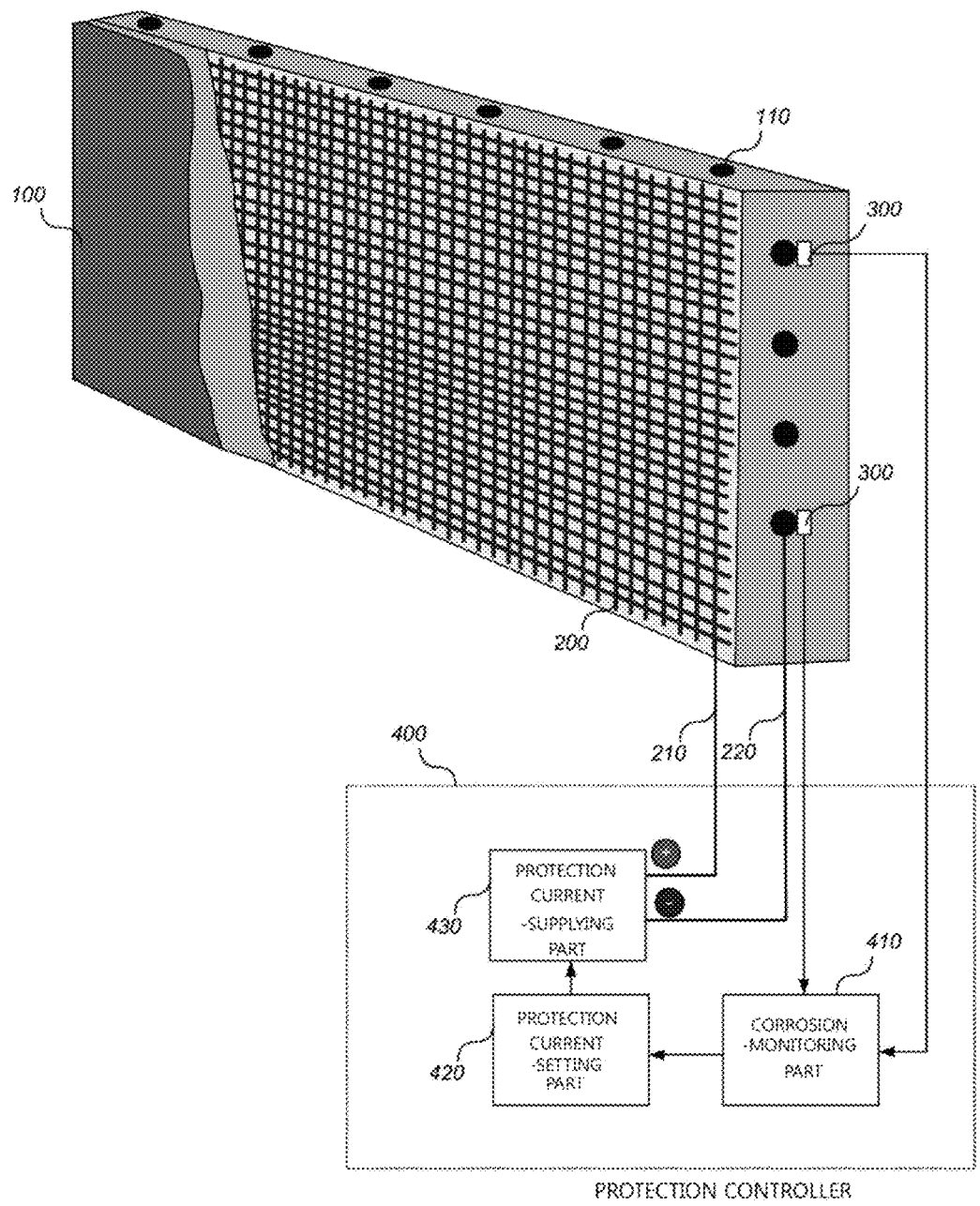
FIG. 3 is a schematic diagram illustrating a system for reinforcing and protecting a reinforced concrete structure employing a carbon fiber textile grid as both a reinforcement member and an anode according to an exemplary embodiment of the present disclosure.
Figure 4:
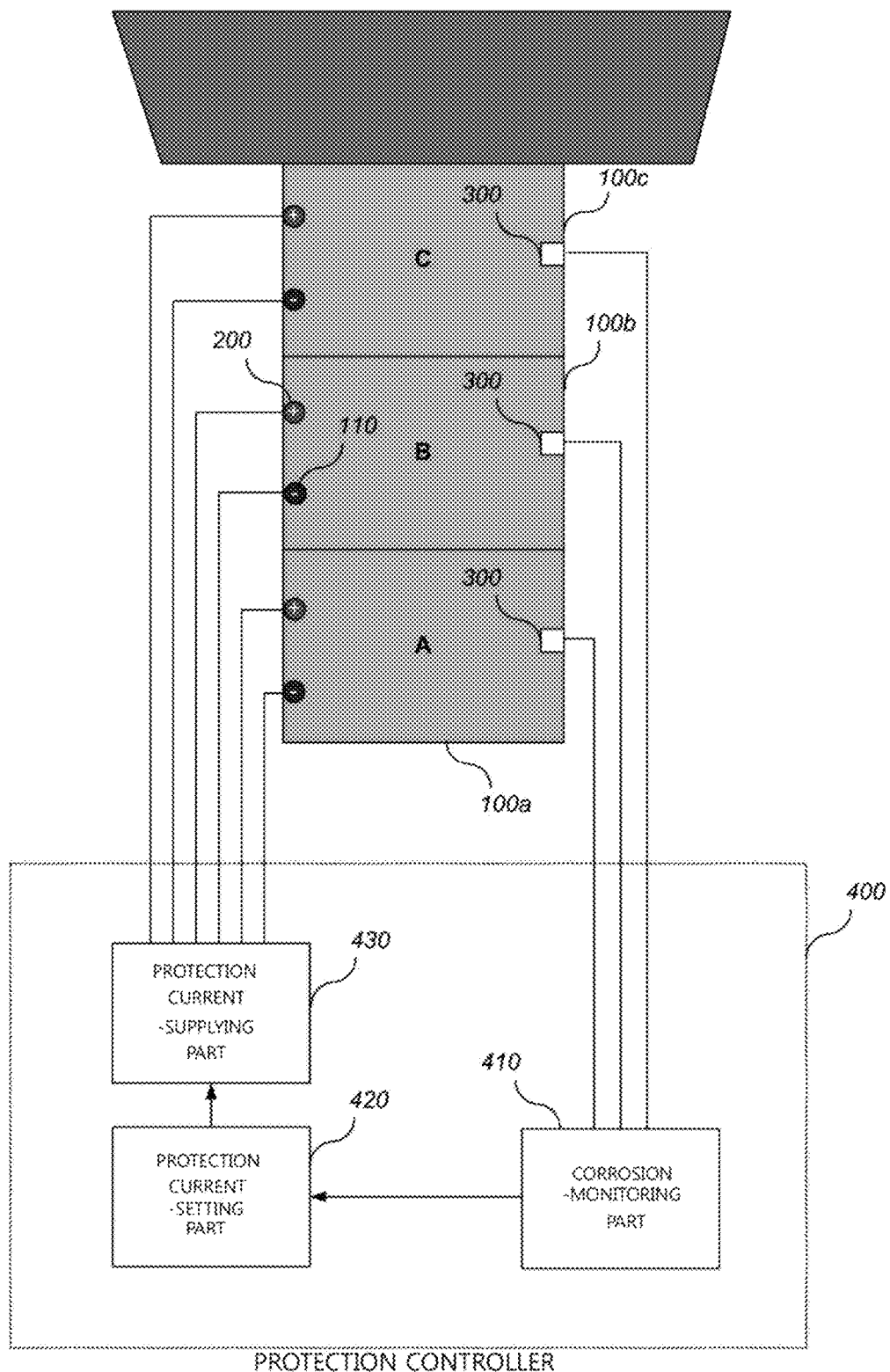
FIG. 4 is a diagram specifically illustrating a system for reinforcing and protecting a reinforced concrete structure employing a carbon fiber textile grid as both a reinforcement member and an anode according to an exemplary embodiment of the present disclosure.

FIG. 3 is a schematic diagram illustrating a system for reinforcing and protecting a reinforced concrete structure employing a carbon fiber textile grid as both a reinforcement member and an anode according to an exemplary embodiment of the present disclosure, and FIG. 4 is a diagram specifically illustrating a system for reinforcing and protecting a reinforced concrete structure employing a carbon fiber textile grid as both a reinforcement member and an anode according to an exemplary embodiment of the present disclosure.

Referring to FIGS. 3 and 4, the system for reinforcing and protecting a reinforced concrete structure employing a carbon fiber textile grid as both a reinforcement member and an anode according to an exemplary embodiment of the present disclosure includes a reinforced concrete structure 100, a carbon fiber textile grid 200, conductive wires 210 and 220 for supplying a protection current, a corrosion factor-measuring sensor 300 and a protection controller 400, wherein the protection controller 400 includes a corrosion-monitoring part 410, a protection current-setting part 420 and a protection current-supplying part 430.

The reinforced concrete structure 100 includes embedded rebar 110, and is divided into cross-sectional regions 100a, 100b and 100c with a predetermined size as shown in FIG. 4. Here, the embedded rebar 110 is embedded in the reinforced concrete structure 100 in horizontal and vertical directions, and subject to corrosion.

The carbon fiber textile grid 200 serves as both a reinforcement member and an anode. Specifically, the carbon fiber textile grid 200 is formed in a lattice shape, disposed adjacent to the surface of the reinforced concrete structure 100 to reinforce the reinforced concrete structure 100, and is formed of a conductive material to be used as an anode (+) for protection of the embedded rebar 110. Here, the carbon fiber textile grid 200 has a higher electrical resistance than a metal, and thus is preferably coated with a material having excellent conductivity such as SBR or nickel to uniformly apply a current. For example, the carbon fiber textile grid 200 may be a generally produced roving cloth, or specially manufactured by adjusting the thickness of carbon fiber or lattice intervals for the purpose of its use, and the carbon fiber textile grid 200 is disposed in a lattice shape to reinforce the required cross-section of the reinforced concrete structure 100, and thus serves as a conductor. Here, the carbon fiber textile grid 200 is connected to the embedded rebar 110 to apply a protection current through a first conductive wire 210 for supplying a protection current to the embedded rebar 110, thereby preventing corrosion of the embedded rebar 110. Accordingly, since the carbon fiber textile grid 200 is disposed close to the surface of the reinforced concrete structure 100, microcracking which may occur in concrete curing may be inhibited to prevent permeation of moisture or a chloride into its surface, resulting in a great improvement in durability and life span of the reinforced concrete structure 100.

The conductive wires 210 and 220 for supplying a protection current are connected to the carbon fiber textile grid 200 and the embedded rebar 110, respectively, to supply a protection current to the embedded rebar 110 by external power. For example, the first conductive wire 210 for supplying a protection current is connected to the carbon fiber textile grid 200, the carbon fiber textile grid 200 is connected directly or via a connecting wire to the embedded rebar 110, and then cement concrete or mortar is poured, thereby preventing corrosion of the embedded rebar 110.

The corrosion factor-measuring sensor 300 is embedded in the reinforced concrete structure 100 to measure a corrosion factor of the embedded rebar 110.

The protection controller 400 consists of a corrosion-monitoring part 410, a protection current-setting part 420 and a protection current-supplying part 430, and automatically monitors the corrosion factor measured by the corrosion factor-measuring sensor 300 and, when the measured corrosion factor is the threshold value or more, automatically supplies external power to the carbon fiber textile grid 200, which is an anode, and the embedded rebar 110, which is a cathode, thereby generating a protection current. Accordingly, the protection controller 400 monitors a corrosion factor in each of the cross-sectional regions 100a, 100b and 100c of the divided reinforced concrete structure and automatically supplies a protection current to each of the divided cross-sectional regions, thereby actively performing protection of the reinforced concrete structure 100.

Specifically, the corrosion-monitoring part 410 of the protection controller 400 regularly monitors a corrosion factor measured by the corrosion factor-measuring sensor 300. Here, the corrosion-monitoring part 410 may selectively employ an electrochemical technique (potentiometric method or linear polarization resistance) or a physical technique (optical sensor) as necessary, or a complementary combination thereof in order to monitor the progression of corrosion.

The protection current-setting part 420 of the protection controller 400 sets a suitable protection current by comparing the corrosion factor measured by the corrosion factor-measuring sensor 300 with the corresponding threshold value. For example, the protection current-setting part 420 automatically calculates a suitable protection current required for protection by comparing a corrosion factor (monitoring of corrosion potential/current, rebar resistivity, and optical fiber-based rebar deformation) detected by the corrosion-monitoring part 410 with the corresponding threshold value.

The protection current-supplying part 430 of the protection controller 400 supplies the protection current set by the protection current-setting part 420 to the embedded rebar 110 via the conductive wires 210 and 220 for supplying a protection current. In other words, the protection current-supplying part 430 supplies a protection current via the conductive wires 210 and 220 for supplying a protection current connected to the carbon fiber textile grid 200, which is an anode, and the embedded rebar 100, respectively.

Here, power required for generation of a protection current is preferably supplied from a solar cell or wind power generator, which is installed nearby the reinforced concrete structure 100. At this time, when a protection current is supplied, the corrosion of the embedded rebar 110 is stopped.

According to an exemplary embodiment of the present disclosure, in construction or reinforcement of the cross-section of the reinforced concrete structure 100, the carbon fiber textile grid 200 is disposed adjacent to the surface of the reinforced concrete structure 100 for the carbon fiber textile grid 200 to inhibit microcracking, resulting in an improvement in durability and life span of the reinforced concrete structure 100.

In addition, the conductive wires 210 and 220 for supplying a protection current by which external power may be supplied are connected to the carbon fiber textile grid 200 and the embedded rebar 110, respectively, and in public use, corrosion factors (corrosion current, etc.) of the embedded rebar may be automatically monitored by the embedded corrosion factor-measuring sensor 300, and when the measured corrosion factor is the threshold value or more, external power may be automatically supplied to the carbon fiber textile grid 200 as an anode and the embedded rebar 110 as a cathode, thereby generating a protection current, resulting in prevention of corrosion of the embedded rebar 110, and reinforcement of the reinforced concrete structure 100.

Particularly, continuous corrosion monitoring of corrosion factors is performed, and external power is automatically supplied according to the degree of corrosion progression to perform cathodic protection. Here, power required for the corrosion monitoring and the cathodic protection may be self-supplied by using constant energy sources on the periphery, for example, a wind power generator and a solar cell module, and the cross-sections of the reinforced concrete structure 100 in which the carbon fiber textile grid 200 is additionally disposed is divided into at least two or more sections in a horizontal or vertical direction according to a corrosive environment and insulated, and thus can be independently protected.

In the case of the system for reinforcing and protecting a reinforced concrete structure employing a carbon fiber textile grid as both a reinforcement member and an anode according to an exemplary embodiment of the present disclosure, the protection of the reinforced concrete structure 100 may be actively performed by dividing the reinforced concrete structure, and automatically supplying a protection current to each of the divided cross-sectional regions by monitoring corrosion factors in the divided cross-sectional regions. In addition, as the level of protection current may be adjusted according to the progression of corrosion in each of the divided cross-sectional regions 100a, 100b and 100c of the reinforced concrete structure 100, power consumption required for protection may be optimized and the protection may be effectively performed.

Consequently, according to the system for reinforcing and protecting a reinforced concrete structure employing a carbon fiber textile grid as both a reinforcement member and an anode according to an exemplary embodiment of the present disclosure, the carbon fiber textile grid 200 is disposed adjacent to the surface of the reinforced concrete structure 100 to inhibit microcracking, a second conductive wire 220 for supplying a protection current which can supply external power is connected to each of the carbon fiber textile grid 200 and the embedded rebar 110, and in public use, corrosion factors of the rebar 110 are automatically monitored by the embedded corrosion factor-measuring sensor 300, and when the measured corrosion factor is the threshold value or more, external power is supplied to the carbon fiber textile grid 200 and the embedded rebar 110 to generate a protection current, thereby preventing the corrosion of the embedded rebar 110 and reinforcing the reinforced concrete structure.

[Method of Reinforcing and Protecting Reinforced Concrete Structure Employing a Carbon Fiber Textile Grid as Both a Reinforcement Member and an Anode]

Figure 5:
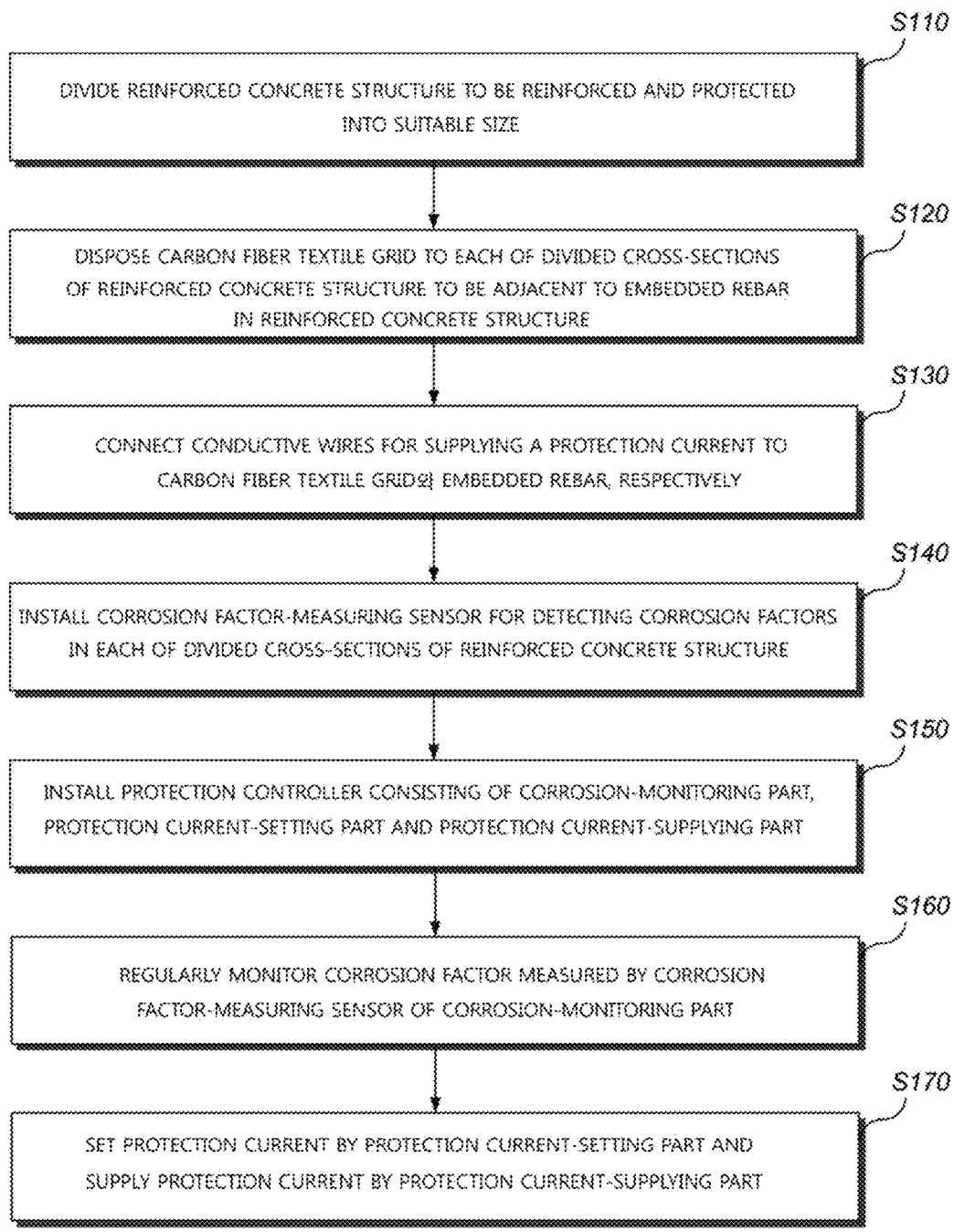
FIG. 5 is a flowchart illustrating a method of reinforcing and protecting a reinforced concrete structure employing a carbon fiber textile grid as both a reinforcement member and an anode according to an exemplary embodiment of the present disclosure.

FIG. 5 is a flowchart illustrating a method of reinforcing and protecting a reinforced concrete structure employing a carbon fiber textile grid as both a reinforcement member and an anode according to an exemplary embodiment of the present disclosure.

Figure 6:
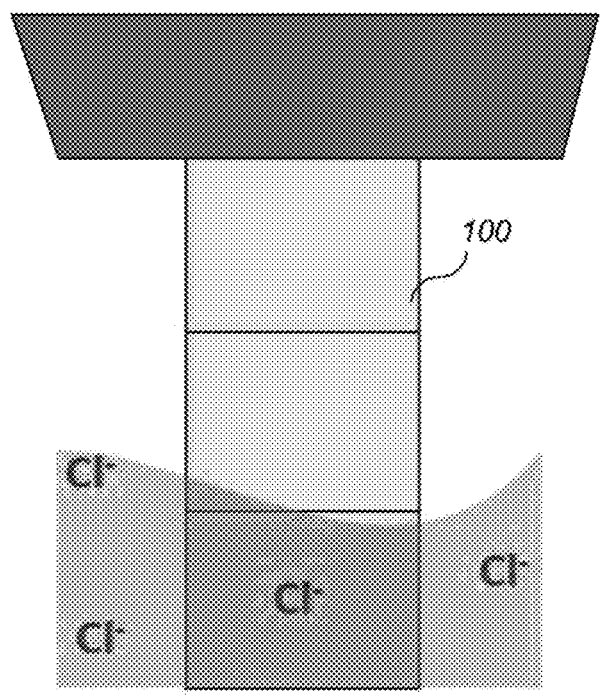
FIG. 6 is a cross-sectional view of a corresponding reinforced concrete structure used in the method of reinforcing and protecting a reinforced concrete structure employing a carbon fiber textile grid as both a reinforcement member and an anode according to an exemplary embodiment of the present disclosure.
Figure 7:
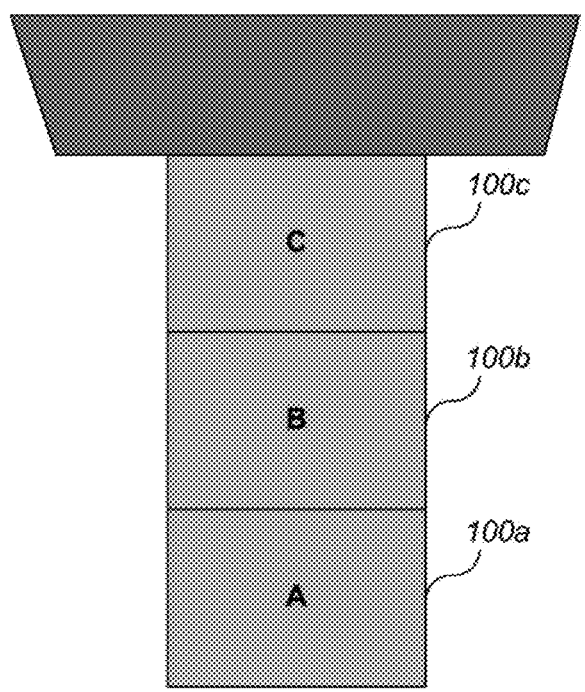
FIG. 7 is a cross-sectional view illustrating the division of reinforcement and protection regions in consideration of corrosive environments required by the method of reinforcing and protecting a reinforced concrete structure employing a carbon fiber textile grid as both a reinforcement member and an anode according to an exemplary embodiment of the present disclosure.

Referring to FIG. 5, in the method of reinforcing and protecting a reinforced concrete structure employing a carbon fiber textile grid as both a reinforcement member and an anode according to an exemplary embodiment of the present disclosure, first, a reinforced concrete structure 100 to be reinforced and protected is divided into a suitable size (S110). Specifically, FIG. 6 is a cross-sectional view of a corresponding reinforced concrete structure, and FIG. 7 is a cross-sectional view illustrating the division of reinforcement and protection regions in consideration of corrosive environments. As shown in FIG. 6, the reinforced concrete structure 100 may be exposed to a corrosive environment, and as shown in FIG. 7, the reinforced concrete structure 100 is divided into a suitable size depending on the purpose of reinforcement and protection. At this time, a carbon fiber textile grid 200 is disposed close to an embedded rebar 110 on the divided cross-section, and then conductive wires 210 and 220 for supplying a protection current are connected to the carbon fiber textile grid 200 and the embedded rebar 110, respectively.

Subsequently, the carbon fiber textile grid 200 is disposed in each of the divided cross-sections 100a, 100b and 100c of the reinforced concrete structure 100 to be adjacent to the embedded rebar 110 in the reinforced concrete structure 100 (S120). Here, the carbon fiber textile grid 200 is disposed adjacent to the surface of the reinforced concrete structure 100 to inhibit microcracking which occurs in concrete curing, and as a reinforcement member preventing permeation of moisture or a chloride, serves as an anode (+), and the embedded rebar 110 serves as a cathode (−).

Subsequently, the conductive wires 210 and 220 for supplying a protection current are connected to the carbon fiber textile grid 200 and the embedded rebar 110, respectively (S130).

Figure 8:
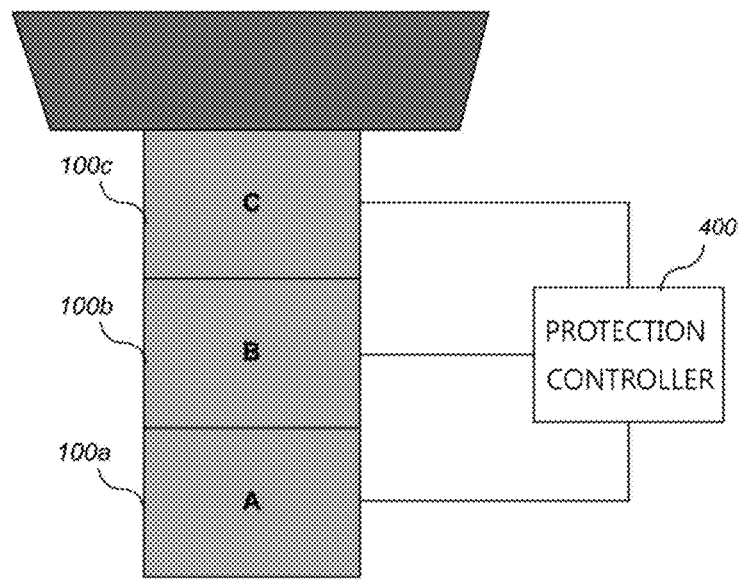
FIG. 8 is a diagram illustrating installation of a protection controller at each section of the corresponding reinforced concrete structure used in the method of reinforcing and protecting a reinforced concrete structure employing a carbon fiber textile grid as both a reinforcement member and an anode according to an exemplary embodiment of the present disclosure.

Subsequently, a corrosion factor-measuring sensor 300 which measures corrosion factors is installed in each of the divided cross-sections 100a, 100b and 100c of the reinforced concrete structure (S140), and then a protection controller 400 consisting of a corrosion-monitoring part 410, a protection current-setting part 420 and a protection current-supplying part 430 is installed (S150). Specifically, FIG. 8 is a diagram illustrating the installation of a protection controller at each section of the corresponding reinforced concrete structure, and as shown in FIG. 8, a corrosion factor-measuring sensor 300 that measures corrosion factors and a protection controller 400 are installed at the divided cross-sections of the reinforced concrete structure.

Figure 9:
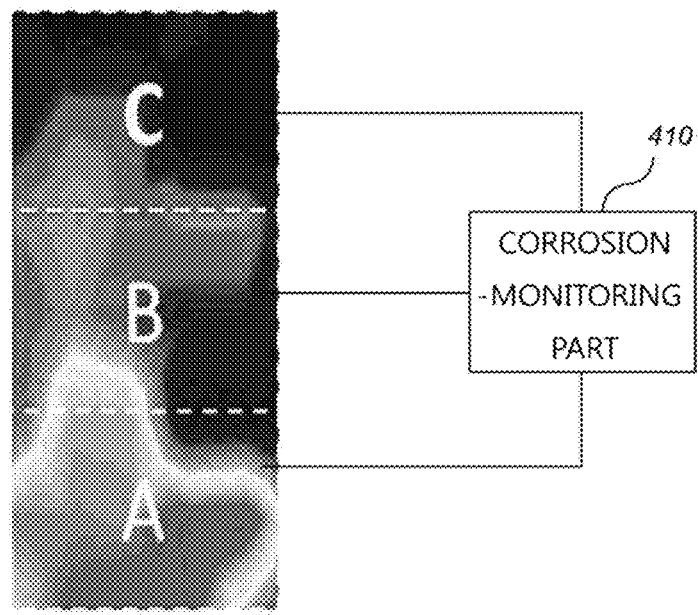
FIG. 9 is a diagram illustrating monitoring of the progression of corrosion in each section in the method of reinforcing and protecting a reinforced concrete structure employing a carbon fiber textile grid as both a reinforcement member and an anode according to an exemplary embodiment of the present disclosure.

Subsequently, the corrosion-monitoring part 410 of the protection controller 400 monitors the measured corrosion factor (S160). Specifically, FIG. 9 is a diagram illustrating monitoring of the progression of corrosion in each section, and as shown in FIG. 9, the corrosion-monitoring part 410 of the protection controller 400 regularly monitors a corrosion factor measured by the corrosion factor-measuring sensor 300.

Figure 10:
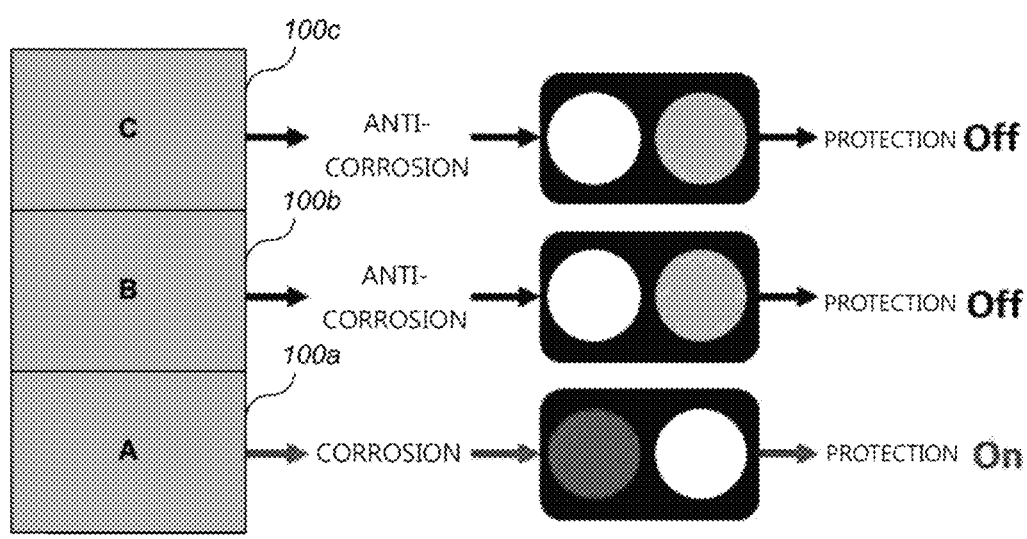
FIG. 10 is a diagram illustrating the determination of the necessity of protection and selective control of protection depending on the degree of corrosion in in the method of reinforcing and protecting a reinforced concrete structure employing a carbon fiber textile grid as both a reinforcement member and an anode according to an exemplary embodiment of the present disclosure.

Afterward, the protection current-setting part 420 of the protection controller 400 sets a suitable protection current by comparing the corrosion factor measured by the corrosion factor-measuring sensor 300 with the corresponding threshold value, and the protection current-supplying part 430 of the protection controller 400 supplies a protection current via the conductive wires 210 and 220 for supplying a protection current (S170). Specifically, FIG. 10 is a diagram illustrating the determination of the necessity of protection and selective control of protection depending on the degree of corrosion, and the protection current-setting part 420 of the protection controller 400 sets a suitable protection current by comparing a corrosion factor with the corresponding threshold value, and the protection current-supplying part 430 supplies a protection current via the conductive wires 210 and 220 for supplying a protection current.

Consequently, according to the exemplary embodiment of the present disclosure, the reinforced concrete structure is divided, corrosion factors in the divided cross-sectional regions are monitored to automatically supply a protection current to each of the divided cross-sectional regions, thereby actively performing protection of the reinforced concrete structure.

In addition, as the level of the protection current is adjusted according to the progression of corrosion in each of the divided cross-sectional regions of the reinforced concrete structure, power consumption required for protection may be optimized and the protection may be effectively performed.

Moreover, in order to employ a carbon fiber textile grid as both a reinforcement member and an anode of the reinforced concrete structure, the carbon fiber textile grid is disposed close to the surface of the reinforced concrete structure to inhibit microcracking which may occur in concrete curing, thereby preventing permeation of moisture or a chloride into the surface thereof, resulting in a great improvement in durability and life span of the reinforced concrete structure.

According to the present disclosure, protection of a reinforced concrete structure can be actively performed by dividing the reinforced concrete structure and monitoring corrosion factors of the divided cross-sectional regions to automatically supply a protection current to each of the divided cross-sectional regions.

According to the present disclosure, a protection current can be adjusted to a suitable level according to the progression of corrosion for each divided cross-sectional region of the reinforced concrete structure, thereby optimizing power consumption required for protection, and effectively performing protection.

According to the present disclosure, as a carbon fiber textile grid is disposed close to the surface of the reinforced concrete structure to be used as both a reinforcement member and an anode of the reinforced concrete structure, microcracking which may occur in concrete curing, can be inhibited to prevent permeation of moisture or a chloride into the surface thereof, resulting in a great improvement in durability and life span of the reinforced concrete structure.

The above description of the present disclosure is intended to be illustrative, and it will be understood by those of ordinary skill in the art that the present disclosure can be easily modified into other specific forms without changing the technical idea or essential features of the present disclosure. Therefore, it should be understood that the above-described embodiments are illustrative, not limitive, in all aspects. For example, each component described as a single unit may be distributed and implemented, and components described as being distributed may also be implemented in a combined form.

The scope of the present disclosure is defined by the appended claims rather than the foregoing description, and it should be construed that the meaning and scope of the claims and all alterations or modifications coming from the equivalents thereof are included in the scope of the present disclosure.

What is claimed is:

1. A method for reinforcing and protecting a reinforced concrete structure employing a carbon fiber textile grid as both a reinforcement member and an anode, the method comprising:
   a) dividing a reinforced concrete structure to be reinforced and protected into cross-sections;
   b) disposing a carbon fiber textile grid in each of the divided cross-sections of the reinforced concrete structure, each carbon fiber textile grid to be adjacent to rebar embedded in the reinforced concrete structure;
   c) connecting conductive wires for supplying a protection current to the carbon fiber textile grid and the embedded rebar, respectively;
   d) installing a corrosion factor-measuring sensor for measuring a corrosion factor in each of the divided cross-sections of the reinforced concrete structure;

e) installing a protection controller comprising a corrosion-monitoring part, a protection current-setting part and a protection current-supplying part;

f) regularly monitoring the measured corrosion factor by the corrosion-monitoring part of the protection controller; and g) setting a suitable protection current using the protection current-setting part of the protection controller by comparing the correction factor measured by the corrosion factor-measuring sensor with a corresponding threshold value, and supplying a protection current by the protection current-supplying part of the protection controller through the conductive wires, wherein the protection controller monitors each of corrosion factors in a divided cross-sectional region of the reinforced concrete structure and automatically supplies the protection current to each divided cross-sectional region to protect the reinforced concrete structure, and wherein the cross-sectional regions of the reinforced concrete structure are divided into at least two regions in a horizontal or vertical direction according to a corrosive environment, and the at least two regions are insulated and independently protected.

2. The method according to claim 1, wherein the carbon fiber textile grid is disposed adjacent to the surface of the reinforced concrete structure to inhibit microcracking occurring during concrete curing and used as a reinforcement member to prevent permeation of moisture or a chloride, wherein the carbon fiber textile grid serves as an anode and the embedded bar serves as a cathode.

3. The method according to claim 1, wherein the carbon fiber textile grid is coated with a material comprising styrene butadiene rubber (SBR) or nickel, to uniformly apply an electric current.

4. The method according to claim 1, wherein the protection controller comprises:
- a corrosion-monitoring part regularly monitoring the corrosion factors measured by the corrosion factor-measuring sensor;
- a protection current-setting part sets a suitable protection current by comparing the corresponding threshold value with the corrosion factor measured by the corrosion factor-measuring sensor; and
- a protection current-supplying part supplies the protection current set by the protection current-setting part to the embedded rebar through the conductive wires.

5. The method according to claim 4, wherein the corrosion-monitoring part employs an electrochemical method or a physical method selectively as necessary, or a complementary combination thereof in order to monitor the corrosion of the embedded rebar, wherein the electrochemical method comprises the potentiometric method or linear polarization resistance and the physical method comprises optical sensor.

* * * * *